(12) United States Patent
Courtright et al.

(10) Patent No.: US 10,504,032 B2
(45) Date of Patent: Dec. 10, 2019

(54) INTELLIGENT SIGNAL MATCHING OF DISPARATE INPUT SIGNALS IN COMPLEX COMPUTING NETWORKS

(71) Applicant: RESEARCH NOW GROUP, INC., Plano, TX (US)

(72) Inventors: Melanie D. Courtright, Plano, TX (US); Vincent P. Derobertis, Plano, TX (US); Michael D. Bigby, Plano, TX (US); William C. Robinson, Plano, TX (US); Greg Ellis, Plano, TX (US); Heidi D. E. Wilton, Toronto (CA); John R. Rothwell, Plano, TX (US); Jeremy S. Antoniuk, Plano, TX (US)

(73) Assignee: Research Now Group, LLC, Plano, TX (US)

( * ) Notice: Subject to any disclaimer, the term of this patent is extended or adjusted under 35 U.S.C. 154(b) by 326 days.

(21) Appl. No.: 15/470,583

(22) Filed: Mar. 27, 2017

(65) Prior Publication Data

US 2017/0286542 A1    Oct. 5, 2017

Related U.S. Application Data

(60) Provisional application No. 62/314,848, filed on Mar. 29, 2016.

(51) Int. Cl.

| G06N 7/04 | (2006.01) |
|---|---|
| H04W 4/02 | (2018.01) |
| H04L 12/46 | (2006.01) |
| H04L 12/00 | (2006.01) |
| G06F 9/00 | (2006.01) |
| H04L 29/06 | (2006.01) |
| H04L 29/00 | (2006.01) |

(52) U.S. Cl.
CPC .............. *G06N 7/04* (2013.01); *G06F 9/00* (2013.01); *H04L 12/00* (2013.01); *H04L 12/4625* (2013.01); *H04L 29/06* (2013.01); *H04W 4/02* (2013.01); *H04L 29/00* (2013.01)

(58) Field of Classification Search
CPC combination set(s) only.
See application file for complete search history.

(56) References Cited

U.S. PATENT DOCUMENTS

| 6,564,182 | B1* | 5/2003 | Gao | G10L 25/90 704/207 |
|---|---|---|---|---|
| 6,862,567 | B1* | 3/2005 | Gao | G10L 21/0208 704/225 |
| 7,200,187 | B2* | 4/2007 | O'Brien | H03F 3/2171 320/145 |
| 7,310,599 | B2* | 12/2007 | Frey | G10L 15/02 704/231 |
| 2003/0022651 | A1* | 1/2003 | Bannasch | H04B 1/707 455/307 |

(Continued)

OTHER PUBLICATIONS

International Search Report and Written Opinion in connection with International Application No. PCT/US2017/024350, 10 pages.

*Primary Examiner* — Jenee Holland
(74) *Attorney, Agent, or Firm* — Baker & McKenzie LLP

(57) ABSTRACT

This disclosure is directed to an apparatus for intelligent matching of disparate input signals received from disparate input signal systems in a complex computing network for establishing targeted communication to a computing device associated with the intelligently matched disparate input signals.

20 Claims, 4 Drawing Sheets

(56) References Cited

U.S. PATENT DOCUMENTS

| | | | |
|---|---|---|---|
| 2003/0161411 A1* | 8/2003 | McCorkle | G01S 7/023 375/295 |
| 2003/0225770 A1* | 12/2003 | Lang | G06F 16/215 |
| 2008/0250057 A1* | 10/2008 | Rothstein | G06F 16/20 |
| 2010/0223139 A1 | 9/2010 | Bosan et al. | |
| 2011/0082735 A1 | 4/2011 | Kannan et al. | |
| 2012/0054232 A1* | 3/2012 | Ross | G06Q 10/08 707/769 |
| 2012/0209705 A1 | 8/2012 | Ramer et al. | |
| 2012/0239491 A1 | 9/2012 | Kruglick | |
| 2013/0173517 A1 | 7/2013 | Berus | |
| 2014/0274022 A1 | 9/2014 | Bell et al. | |
| 2015/0244430 A1* | 8/2015 | Shattil | H04B 1/0003 370/254 |
| 2015/0270882 A1* | 9/2015 | Shattil | H04B 1/0003 370/329 |
| 2015/0303950 A1* | 10/2015 | Shattil | H04B 1/0003 370/328 |
| 2015/0341190 A1* | 11/2015 | Cipriano | H04L 25/03076 375/232 |
| 2016/0094318 A1* | 3/2016 | Shattil | H04B 7/026 375/267 |

\* cited by examiner

INTELLIGENT SIGNAL MATCHING OF DISPARATE INPUT SIGNALS IN COMPLEX COMPUTING NETWORKS

CROSS-REFERENCE TO RELATED APPLICATIONS

This application claims priority to U.S. Provisional Application No. 62/314,848, filed Mar. 29, 2016, titled "Intelligent Signal Matching of Disparate Input Signals in Complex Computing Networks," the disclosure of which is incorporated by reference in its entirety for all purposes.

TECHNICAL FIELD

This disclosure is directed to intelligent signal matching in complex computing networks, suitably assigned to, in order of preference:
1) USPC 707/705 or 707/821 (Art Unit 2161) corresponding to CPC G06F 17/30864 and G06F 17/30067 respectively.
2) USPC 709/246 or 709/238 (Art Unit 2447) corresponding to CPC H04L 29/00.
3) USPC 706/001 or 706/900 (Art Unit 2129) both corresponding to CPC G06N 7/04.

BACKGROUND

There is a need for digital signal processors to perform matching of disparate input signals received from disparate input signal systems in a complex computing network in order to generate and establish targeted communication in the complex computing network.

BRIEF SUMMARY

In some embodiments, an apparatus is provided for intelligent matching of disparate input signals received from disparate input signal systems in a complex computing network for establishing targeted communication to a computing device associated with the intelligently matched disparate input signals, the intelligent matching and the targeted communication being necessarily rooted in computing technology. The apparatus comprises a signal communication interface for: establishing a first connection to a first input signal system, the first input signal system being associated with a first set of input signals, the first set of input signals being associated with a first set of signal attributes; receiving a first input signal, from the first set of input signals, on the first connection; establishing a second connection to a second input signal system, the second input signal system being associated with a second set of input signals, the second set of input signals being associated with a second set of signal attributes; receiving a second input signal, from the second set of input signals, on the second connection; establishing, based on a routing signal, a third connection to a computing device; transmitting a targeted communication to the computing device; and receiving a response to the targeted communication from the computing device or a different computing device.

The apparatus further comprises a signal sensor for sensing a first signal attribute, from the first set of signal attributes, associated with the first input signal; and sensing a second signal attribute, from the second set of signal attributes, associated with the second input signal. The apparatus further comprises a digital signal processor for applying a signal cleansing process to at least one attribute from the second set of signal attributes; determining the first signal attribute matches the second signal attribute; determining, based on the first signal attribute matching the second signal attribute, the first input signal matches the second input signal; identifying a routing signal associated with the first input signal or the second input signal; generating a targeted communication for transmission to the computing device accessible using the routing signal; and first associating, with the first input signal or the second input signal, the response to the targeted communication received from the computing device or a different computing device.

In some embodiments, the digital signal processor is further for integrating the first input signal with the second input signal.

In some embodiments, the signal communication interface receives the first signal and the second signal in real-time before the targeted communication is generated.

In some embodiments, the set of second input signals is segmented into a first segment of input signals and a second segment of input signals.

In some embodiments, the second input signal is associated with the first segment of input signals.

In some embodiments, the digital signal processor is further for determining, based on the response to the targeted communication, whether to associate the first input signal or the second input signal with the first segment of input signals or the second set of input signals.

In some embodiments, the digital signal processor is further for determining a third input signal received from a third input signal system, the third input signal previously matched with the first input signal; and second associating the third input signal with the first association.

In some embodiments, the computing device comprises a mobile phone.

In some embodiments, the second input signal is part of the second set of input signals at a first time, wherein the digital signal processor is further for determining the first input signal matches the second input signal at the first time.

In some embodiments, the digital signal processor is further for determining the second input signal is not part of the second set of input signals at a second time, wherein the determination that the second input signal is not part of the second set of input signals at a second time comprises a signal absence event.

In some embodiments, the digital signal processor is further for second associating the signal absence event with the first association.

In some embodiments, the digital signal processor is further for generating a second targeted communication for transmission to the computing device accessible using the routing signal, the second targeted communication being based on the signal absence event; receiving, from the computing device, a second response to the targeted communication; and second associating the second response with the first association.

In some embodiments, the second input signal is part of the second set of input signals at a first time, wherein the digital signal processor is further for determining the first input signal matches the second input signal at the first time, wherein the second input signal is part of the second set of input signals at the second time, wherein the digital signal processor is further for: determining the first input signal does not match the second input signal at the first time; and second associating the determination that the first input signal does not match the second input signal at the first time with the first association.

In some embodiments, the digital signal processor is further for determining a correlation between a third signal attribute from the first set of signal attributes and a fourth signal attribute from the second set of signal attributes; and constructing a correlative model based on the correlation.

In some embodiments, the first signal attribute comprises a digital computing device signal attribute, and wherein the digital computing device signal attribute is based on monitoring a computing device history associated with the first input signal or the second input signal.

In some embodiments, the digital signal processor is further for receiving a computing device signal, and second associating the computing device signal with the first association.

In some embodiments, the second input signal comprises a predicted second input signal.

In some embodiments, another apparatus for intelligent matching of disparate input signals received from disparate input signal systems in a complex computing network for establishing targeted communication to a computing device associated with the intelligently matched disparate input signals, the intelligent matching and the targeted communication being necessarily rooted in computing technology. The apparatus comprises: a signal communication means for establishing a first connection to a first input signal system, the first input signal system being associated with a first set of input signals, the first set of input signals being associated with a first set of signal attributes; receiving a first input signal, from the first set of input signals, on the first connection; establishing a second connection to a second input signal system, the second input signal system being associated with a second set of input signals, the second set of input signals being associated with a second set of signal attributes; receiving a second input signal, from the second set of input signals, on the second connection; establishing, based on a routing signal, a third connection to a computing device; transmitting a targeted communication to the computing device; and receiving a response to the targeted communication from the computing device; a signal sensing means for: sensing a first signal attribute, from the first set of signal attributes, associated with the first input signal; and sensing a second signal attribute, from the second set of signal attributes, associated with the second input signal; a routing identification means for identifying a routing signal associated with the first input signal or the second input signal; a signal cleansing means for cleansing at least one attribute from the second set of signal attributes; an intelligent signal matching means for determining the first signal attribute matches the second signal attribute; determining, based on the first signal attribute matching the second signal attribute, the first input signal matches the second input signal; a targeted communication generating means for generating a targeted communication for transmission to the computing device accessible using the routing signal; and a signal association means for first associating, with the first input signal or the second input signal, the response to the targeted communication received from the computing device.

In some embodiments, at least one of the signal sensing means, the routing identification means, the signal cleansing means, the intelligent signal matching means, the targeted communication generating means, and the signal association means are comprised in a digital signal processor.

In some embodiments, the digital signal processor is further to: determine a third set of input signals associated with the first input signal system that matches with a fourth set of input signals associated with the second input signal system; determine attributes associated with the matched set of input signals; determine, based on the attributes, a first segment of the input signals and a second segment of the input signals; and generate a segment targeted communication for transmission to the first segment of the input signals. The targeted communication may be transmitted to one or more routing signals or computing devices associated with the first segment. A different targeted communication may be generated for transmission to a second segment.

In some embodiments, the digital signal processor is further to: determine a real-time attribute associated with the first input signal or the second input signal; determine the real-time attribute associated with the first input signal is asynchronous with a matched set of attributes associated with the first input signal or the second input signal; and generate, based on the real-time attribute, a targeted communication for real-time transmission to the computing device.

In some embodiments, the real-time attribute comprises a location or a computing operation.

In some embodiments, the matched set of attributes does not comprise a location or a computing operation.

In some embodiments, the matched set of attributes comprises a home location or a frequently executed computing operation (e.g., a computing operation associated with the input signal that is executed at least a threshold number of times during a predetermined period in the past).

In some embodiments, the digital signal processor is further to: determine a real-time attribute associated with the first input signal or the second input signal; determine the real-time attribute associated with the first input signal is synchronous with a matched set of attributes associated with the first input signal or the second input signal; and generate, based on the real-time attribute, a targeted communication for real-time transmission to the computing device.

Figure 1:
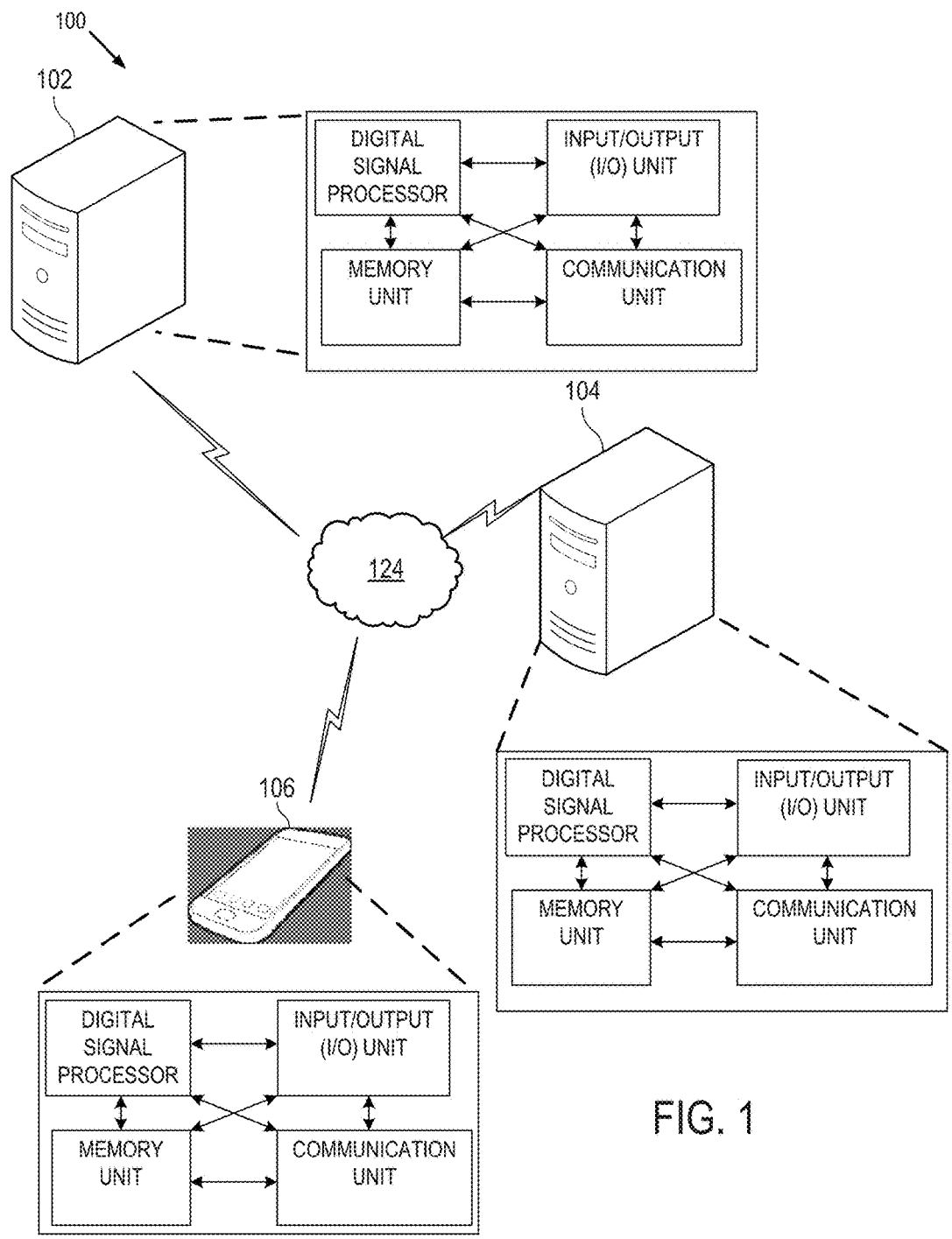
FIG. 1 is a block diagram of a complex computing network for intelligent matching of disparate input signals, in accordance with some embodiments of the invention.

All of these drawings are illustrations of certain embodiments. The scope of the claims is not limited to the specific embodiments illustrated in the drawings and described below.

DETAILED DESCRIPTION OF THE EMBODIMENTS

FIG. 1 is a block diagram of a complex computing network 100 for intelligent matching of disparate input signals. The network comprises a first input signal system 102, a second input signal system 104, and a computing device 106 (e.g., a non-mobile computing device such as a desktop computer or a mobile computing device such as a mobile phone, laptop, tablet, watch, etc.). Each of the first input signal system, the second input signal system, and the computing device may comprise a digital signal processor, a memory unit, an input/output (I/O) unit, and a communication unit. The digital signal processor, the memory unit, the I/O unit, and the communication unit are described in further detail in FIG. 2. The functionality of multiple input signal systems may be combined into a single input signal system. More than two input signal systems may be provided. In some embodiments, the term "signal" may refer to "data" or "information." Any reference to signals may also include references to the contents of the signals, e.g., signal attributes. Any signals as described herein may be electronic or electromagnetic signals. Additionally, any signals may be either be transitory or non-transitory signals. The terms system, apparatus, device, etc., may be used interchangeably. In some embodiments, a method is provided for performing the various steps performed by any input signal system or computing device described herein. In some embodiments, a non-transitory computer-readable medium comprising code is provided for causing an input signal system or computing device to perform the various methods described herein.

Figure 2:
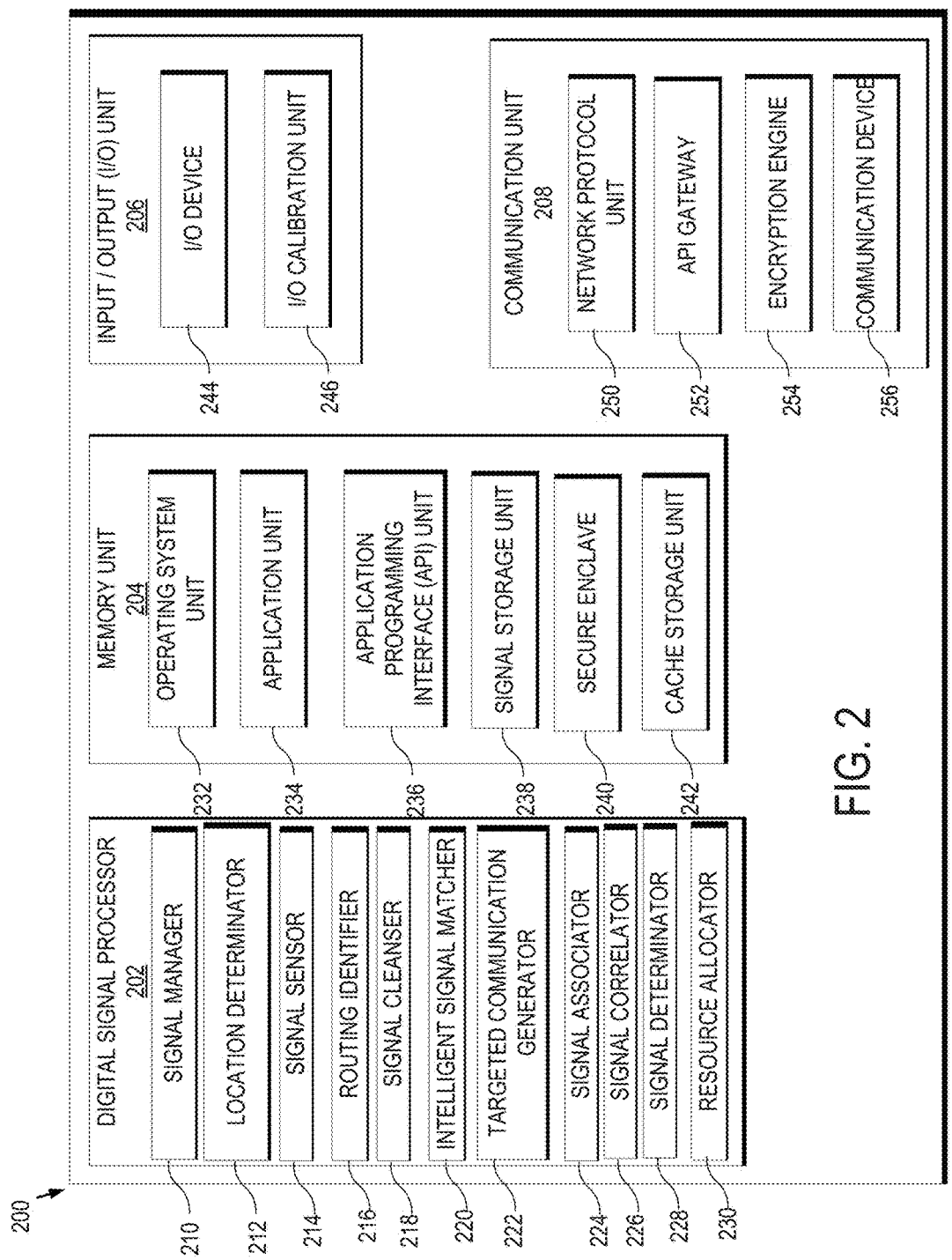
FIG. 2 is a block diagram of a complex computing environment for intelligent matching of disparate input signals, in accordance with some embodiments of the invention.

FIG. 2 illustrates an exemplary complex computing environment 200 for intelligent matching of disparate input signals. For example, the computing environment 200 may be included in and/or utilized by the first input signal system 102, the second input signal system 104, the computing device 106, and/or any other device described herein. The computing environment and/or any of its units and/or subunits described herein may include general hardware, specifically-purposed hardware, and/or software.

The computing environment may include, among other elements, a digital signal processor 202, a memory unit 204, an input/output (I/O) unit 206, and/or a communication unit 208. As described herein, each of the digital signal processor, the memory unit, the I/O unit, and/or the communication unit may include and/or refer to a plurality of respective units, subunits, and/or elements. The various units, subunits, and/or elements may be implemented entirely in hardware, entirely in software, or in a combination of hardware and software. Any software described herein may be specially purposed software for performing a particular function. In some embodiments, hardware may also be specially purposed hardware for performing some particular functions. Furthermore, each of the digital signal processor, the memory unit, the I/O unit, and/or the communication unit may be operatively and/or otherwise communicatively coupled with each other.

The digital signal processor may control any of the other units, elements of the units, and/or functions performed by the units. Any actions described herein as being performed by a processor may be taken by the digital signal processor alone and/or by the digital signal processor in conjunction with one or more additional processors, units, subunits, elements, components, devices, and/or the like. Additionally, while only one digital signal processor may be shown in FIG. 2, multiple digital signal processors may be present and/or otherwise included in the computing environment. Thus, while instructions may be described as being executed by the digital signal processor (and/or various subunits of the digital signal processor), the instructions may be executed simultaneously, serially, and/or by one or multiple digital signal processors in parallel.

In some embodiments, the digital signal processor may be implemented as one or more computer signal processor (CPU) chips and/or graphical signal processor (GPU) chips and may include a hardware device capable of executing computer instructions. The digital signal processor may execute instructions, codes, computer programs, and/or scripts. The instructions, codes, computer programs, and/or scripts may be received from and/or stored in the memory unit, the I/O unit, the communication unit, subunits and/or elements of the aforementioned units, other devices and/or computing environments, and/or the like. As described herein, any unit and/or subunit (e.g., element) of the computing environment and/or any other computing environment may be utilized to perform any operation. Particularly, the computing environment may not include a generic computing system, but instead may include a customized computing system designed to perform the various methods described herein.

In some embodiments, the digital signal processor may include, among other elements, subunits such as a signal manager 210 (for managing, receiving, processing, analyzing, organizing, and transforming any signals), a location determinator 212 (described below), a signal sensor 214 (for sensing signals and signal attributes), a routing identifier 216 (for identifying routing signals), a signal cleanser 218 (for cleansing signal attributes which may include adding information to, deleting information from, changing information of, a signal attribute), an intelligent signal matcher 220 (for determining whether a signal attribute matches a signal attribute of the same or different signal, or determining whether a signal matches another signal), a targeted communication generator 222 (for generating information for communication to a computing device), a signal associator 224 (for associating one signal to another signal, information such as a response to a targeted communication to a signal, etc.), a signal correlator 226 (for correlating a model to a signal or an association), a signal determinator 228 (for determining presence or absence of a signal or signal attribute), and a resource allocator 230 (described below). Each of the aforementioned subunits of the digital signal processor may be communicatively and/or otherwise operably coupled with each other.

The location determinator may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator may include various sensors, a radar, and/or other specifically-purposed hardware elements for enabling the location determinator to acquire, measure, and/or otherwise transform location information of the computing device in which the location determinator is located or a different computing device.

The resource allocator may facilitate the determination, monitoring, analysis, and/or allocation of computing resources throughout the computing environment. As such, computing resources of the computing environment utilized by the digital signal processor, the memory unit, the I/O unit, and/or the communication unit (and/or any subunit of the aforementioned units) such as processing power, data storage space, network bandwidth, and/or the like may be in high demand at various times during operation. Accordingly, the resource allocator may be configured to manage the allocation of various computing resources as they are required by particular units and/or subunits of the computing environment. In some embodiments, the resource allocator may include sensors and/or other specially-purposed hardware for monitoring performance of each unit and/or subunit of the computing environment, as well as hardware for responding to the computing resource needs of each unit and/or subunit. In some embodiments, the resource allocator may utilize computing resources of a second computing environment separate and distinct from the computing environment to facilitate a desired operation.

For example, the resource allocator may determine a number of signal operations (e.g., signal matching, targeted communication, etc.). The resource allocator may then determine that the number of signal operations meets and/or exceeds a predetermined threshold value. Based on this determination, the resource allocator may determine an amount of additional computing resources (e.g., processing power, storage space of a particular non-transitory computer-readable memory medium, network bandwidth, and/or the like) required by the digital signal processor, the memory unit, the I/O unit, the communication unit, and/or any subunit of the aforementioned units for enabling safe and efficient operation of the computing environment while supporting the number of simultaneous signal operations. The resource allocator may then retrieve, transmit, control, allocate, and/or otherwise distribute determined amount(s) of computing resources to each element (e.g., unit and/or subunit) of the computing environment and/or another computing environment. In some embodiments, the allocation of computing resources of the resource allocator may include the resource allocator flipping a switch, adjusting processing power, adjusting memory size, partitioning a memory element, transmitting signals, controlling one or more input and/or output devices, modifying various communication protocols, and/or the like. In some embodiments, the resource allocator may facilitate utilization of parallel processing techniques, e.g., for parallel signal matching operations.

In some embodiments, the memory unit may be utilized for storing, recalling, receiving, transmitting, and/or accessing various signals, signal attributes, or other information during operation of the computing environment. The memory unit may include various types of signal storage media such as solid state storage media, hard disk storage media, and/or the like. The memory unit may include dedicated hardware elements such as hard drives and/or servers, as well as software elements such as cloud-based storage drives. For example, the memory unit may include various subunits such as an operating system unit 232, an application unit 234, an application programming interface (API) unit 236, a signal storage unit 238 (for storing signals, signal attributes, transmissions, responses, etc.), a secure enclave, and/or a cache storage unit.

The memory unit and/or any of its subunits described herein may include random access memory (RAM), read only memory (ROM), and/or various forms of secondary storage. RAM may be used to store volatile signals and/or to store instructions that may be executed by the digital signal processor. For example, the signals stored may be a command, a current operating state of the computing environment (or of a particular unit or sub-unit of the computing environment), an intended operating state of the computing environment (or of a particular unit or sub-unit of the computing environment), and/or the like. As a further example, signals stored in the memory unit may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of signals or as an over-flow signals storage device if RAM is not large enough to hold all working data. Secondary storage may be used to store programs that may be loaded into RAM when such programs are selected for execution. In some embodiments, the memory unit may include one or more databases for storing any signals described herein. Additionally or alternatively, one or more secondary databases located remotely from the computing environment may be utilized and/or accessed by the memory unit.

The operating system unit may facilitate deployment, storage, access, execution, and/or utilization of an operating system utilized by the computing environment and/or any other computing environment described herein. In some embodiments, the operating system may include various hardware and/or software elements that serve as a structural framework for enabling the digital signal processor to execute various operations described herein. The operating system unit may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user permissions, security credentials, and/or the like.

The application unit may facilitate deployment, storage, access, execution, and/or utilization of an application utilized by the computing environment. For example, users may be required to download, access, and/or otherwise utilize a software application on a computing device such as a smartphone in order for various operations described herein to be performed. Information included in the application unit may enable a user to execute various signal operations described herein. The application unit may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment. For example, computing environment may include one or more APIs for enabling various input signal systems, computing devices, applications, and/or computing environments to communicate with each other and/or perform operations on signals. Accordingly, the API unit may include API databases comprising information that may be accessed and/or utilized by applications and/or operating systems of other devices and/or computing environments. In some embodiments, each API database may be associated with a customized physical circuit included in the memory unit and/or the API unit. Additionally, each API database may be public and/or private, and so authentication credentials may be required to access information in an API database. The signal storage unit may facilitate deployment, storage, access, and/or utilization of signals by any apparatus in the computing environment.

The secure enclave may facilitate secure storage of signals or signal attributes. In some embodiments, the secure enclave may include a partitioned portion of storage media included in the memory unit that is protected by various security measures. For example, the secure enclave may be hardware secured. In other embodiments, the secure enclave may include one or more firewalls, encryption mechanisms, and/or other security-based protocols. Authentication credentials of a user may be required prior to providing the user access to signals stored within the secure enclave.

The cache storage unit may facilitate short-term deployment, storage, access, analysis, and/or utilization of signals. For example, the cache storage unit may serve as a short-term storage location for signals so that the signals (or signal attributes associated with signals) stored in the cache storage unit may be accessed quickly. In some embodiments, the cache storage unit may include RAM and/or other storage media types that enable quick recall of stored signals. The cache storage unit may included a partitioned portion of storage media included in the memory unit.

Any aspect of the memory unit may comprise any collection and arrangement of volatile and/or non-volatile components suitable for storing data. For example, the memory unit may comprise random access memory (RAM) devices, read only memory (ROM) devices, magnetic storage devices, optical storage devices, and/or any other suitable data storage devices. In particular embodiments, the memory unit may represent, in part, computer-readable storage media on which computer instructions and/or logic are encoded. The memory unit may represent any number of memory components within, local to, and/or accessible by a processor.

The I/O unit may include hardware and/or software elements for enabling the computing environment to receive, transmit, and/or present signals. For example, elements of the I/O unit may be used to receive, transmit, and/or present signals, and/or the like. In this manner, the I/O unit may enable the computing environment to interface with a human user. As described herein, the I/O unit may include subunits such as an I/O device 244, and an I/O calibration unit 246.

The I/O device may facilitate the receipt, transmission, processing, presentation, display, input, and/or output of signals as a result of executed processes described herein. In some embodiments, the I/O device may include a plurality of I/O devices. In some embodiments, the I/O device may include one or more elements of a data system, a computing device, a server, and/or a similar device.

The I/O device may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device may communicate with one or more elements of the digital signal processor and/or the memory unit to execute operations described herein.

The I/O calibration unit may facilitate the calibration of the I/O device. For example, the I/O calibration unit may detect and/or determine one or more settings of the I/O device, and then adjust and/or modify settings so that the I/O device may operate more efficiently. In some embodiments, the I/O calibration unit may utilize a calibration driver (or multiple calibration drivers) to calibrate the I/O device.

The communication unit may facilitate establishment, maintenance, monitoring, and/or termination of communications between the computing environment and other devices such as input signal systems, computing devices, other computing environments, third party server systems, and/or the like. The communication unit may further enable communication between various elements (e.g., units and/or subunits) of the computing environment. In some embodiments, the communication unit may include a network protocol unit 250, an API gateway 252, an encryption engine 254, and/or a communication device 256. The communication unit may include hardware and/or software elements.

The network protocol unit may facilitate establishment, maintenance, and/or termination of a communication connection between the computing environment and another device by way of a network. For example, the network protocol unit may detect and/or define a communication protocol required by a particular network and/or network type. Communication protocols utilized by the network protocol unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating signals from being compatible with a first communication protocol to being compatible with a second communication protocol. In some embodiments, the network protocol unit may determine and/or monitor an amount of signal traffic to consequently determine which particular network protocol is to be used for transmitting and/or receiving signals.

The API gateway may facilitate the enablement of other devices and/or computing environments to access the API unit of the memory unit of the computing environment. For example, a computing device may access the API unit via the API gateway. In some embodiments, the API gateway may be required to validate user credentials associated with a user of a computing device prior to providing access to the API unit to the user. The API gateway may include instructions for enabling the computing environment to communicate with another device.

The encryption engine may facilitate translation, encryption, encoding, decryption, and/or decoding of signals received, transmitted, and/or stored by the computing environment. Using the encryption engine, each transmission of signals may be encrypted, encoded, and/or translated for security reasons, and any received signals may be encrypted, encoded, and/or translated prior to its processing and/or storage. In some embodiments, the encryption engine may generate an encryption key, an encoding key, a translation key, and/or the like, which may be transmitted along with any signals. The key may need to be known by the recipient in order to read the signals.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, digital signal processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

Implementation of any unit or sub-unit of any device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Figure 3A:
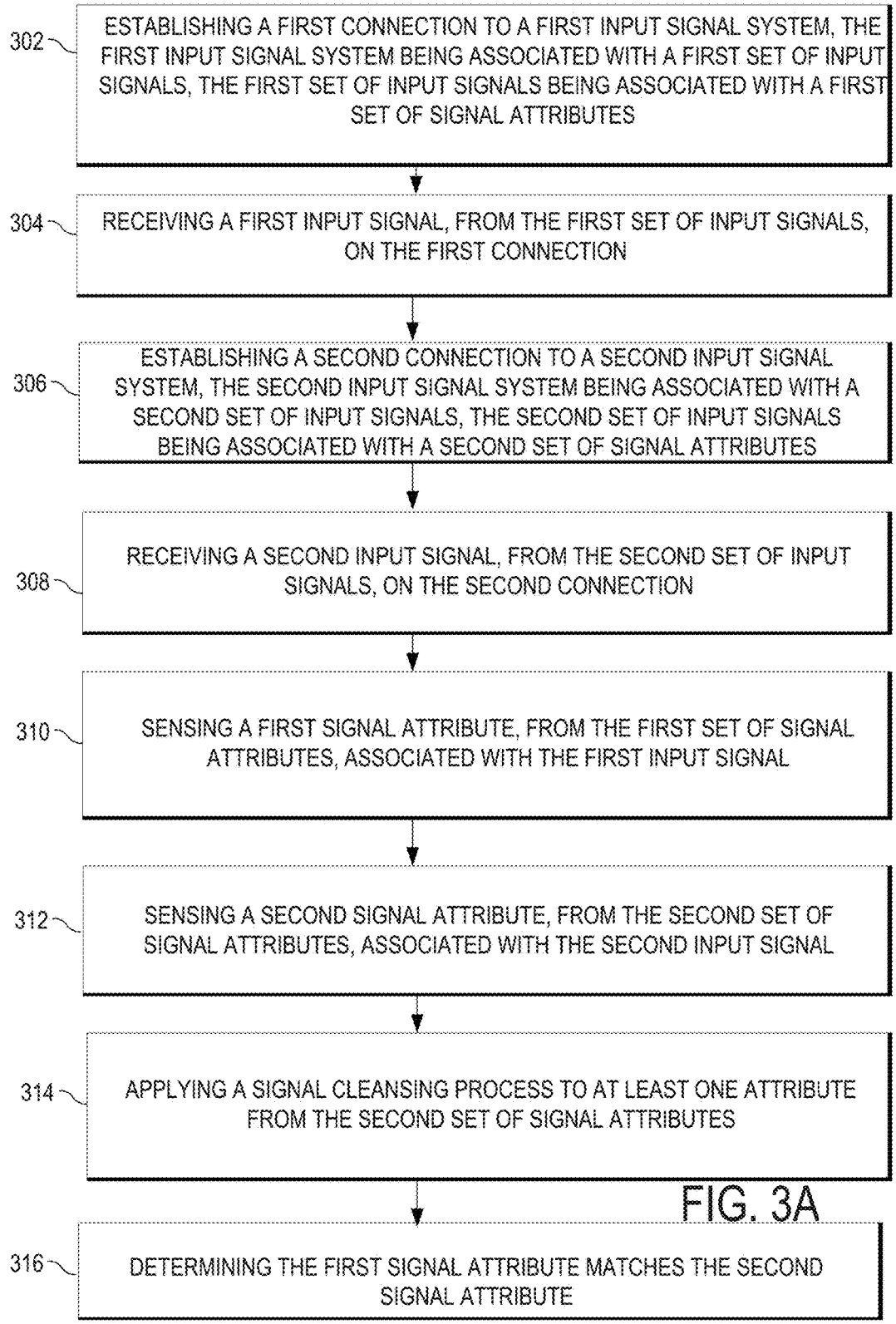
FIGS. 3A and 3B are block diagrams of a method for intelligent matching of disparate input signals in a complex computing network, in accordance with some embodiments of the invention.
Figure 3B:
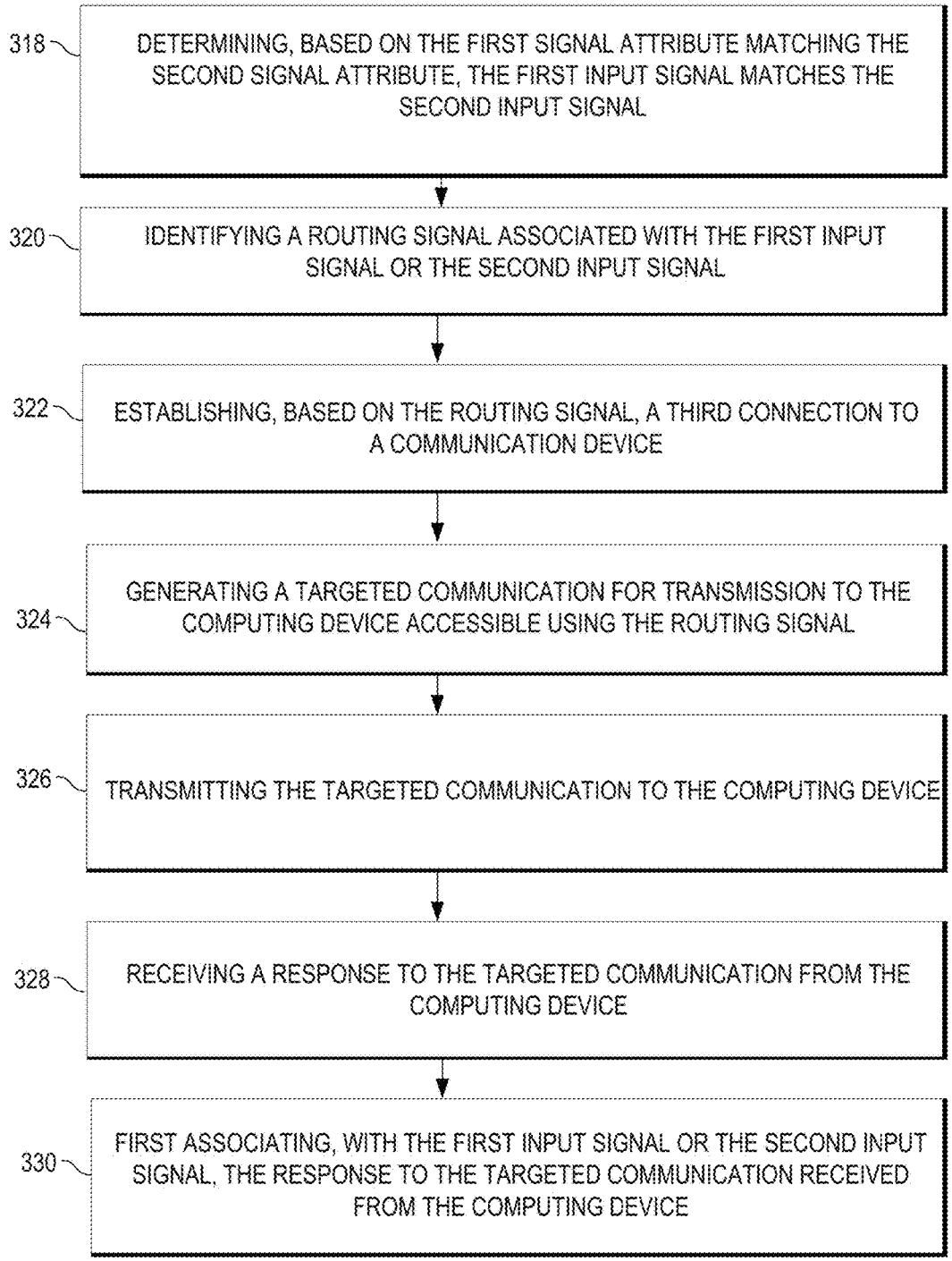

FIGS. 3A and 3B are block diagrams of a method for intelligent matching of disparate input signals in a complex computing network, wherein but for the intelligent matching of the disparate signals, which is necessarily rooted in computing technology, a targeted communication would not be able to be generated and transmitted to a computing device associated with the intelligently matched disparate input signals. The various blocks of FIGS. 3A and 3B may be executed in a different order from that shown in FIG. 3. Some blocks may be optional.

At block 302, the method comprises establishing a first connection to a first input signal system, the first input signal system being associated with a first set of input signals, the first set of input signals being associated with a first set of signal attributes. At block 304, the method comprises receiving a first input signal, from the first set of input signals, on the first connection. At block 306, the method comprises establishing a second connection to a second input signal system, the second input signal system being associated with a second set of input signals, the second set of input signals being associated with a second set of signal attributes. At block 308, the method comprises receiving a second input signal, from the second set of input signals, on the second connection. There may be some overlap between the first set of signal attributes and the second set of signal attributes. Additionally or alternatively, the first set of signal attributes may comprise some unique signal attributes that are not present in the second set of signal attributes, and the second set of signal attributes may comprise some unique signal attributes that are not present in the first set of signal attributes.

At block 310, the method comprises sensing a first signal attribute, from the first set of signal attributes, associated with the first input signal. At block 312, the method comprises sensing a second signal attribute, from the second set of signal attributes, associated with the second input signal. At block 314, the method comprises applying a signal cleansing process to at least one attribute from the second set of signal attributes. The signal cleansing process may comprise adding, deleting, or modifying information (e.g., adding .com to an email address, deleting a duplicate .com of an email address, etc.) associated with the attribute.

At block 316, the method comprises determining the first signal attribute matches the second signal attribute. A match may be associated with a predetermined degree of statistical confidence. At block 318, the method comprises determining, based on the first signal attribute matching the second signal attribute, the first input signal matches the second input signal. A match may be associated with a predetermined degree of statistical confidence. For example, some first signal attributes may match some second signal attributes, and some first signal attributes may not match some second signal attributes, and a match between the first signal and the second signal may still be determined. This is because the matching signal attributes may have higher weightage, and may be considered as more important attributes based on which a match between the first signal and the second signal is determined. In some embodiments, once the first input signal is matched to the second input signal, the method further comprises integrating the first input signal and the second input signal. The integration of both signals may be dynamically created when a matching operation is executed. Additionally or alternatively, the integration of both signals may be stored in an integrated set of signals (e.g., as a relational database).

At block 320, the method comprises identifying a routing signal (e.g., a network address) associated with the first input signal or the second input signal. At block 322, the method comprises establishing, based on a routing signal, a third connection to a computing device. At block 324, the method comprises generating a targeted communication for transmission to the computing device accessible using the routing signal. Prior to transmitting the targeted communication to the computing device, the targeted communication may need to be generated. The targeted communication may be generated dynamically in real-time based upon the first signal attribute of the first input signal that matches with the second signal attribute of the second input signal, or based upon a signal attribute of the first input signal or the second input signal that does not match with or have an equivalent attribute in the other input signal. Alternatively or additionally, the targeted communication may be generated dynamically in real-time to determine input signal attributes that were not received from any input signal system. Alternatively or additionally, the targeted communication may be generated based on previous targeted communications transmitted using the same routing signal. In some embodiments, updates of the first signal and the second signal may be received and/or accessed in real-time before the targeted communication is generated. Therefore, the targeted communication is generated based on the most up-to-date versions of the first input signal and the second input signal.

At block 326, the method comprises transmitting the targeted communication to the computing device. In some embodiments, any transmissions described in this disclosure (e.g., between input signal systems, between an input signal system and a computing device, etc.) may be via any short range (e.g., near field communication, Bluetooth, Bluetooth Low Energy, etc.) or long range wireless transmission mechanisms (e.g., cellular, Wi-Fi, etc.). In some embodiments, the frequency of transmission may not be limited to any particular frequency of the electromagnetic spectrum. At block 328, the method comprises receiving a response to the targeted communication from the computing device.

At block 330, the method comprises associating (referred to as "first associating"), with the first input signal or the second input signal, the response to the targeted communication received from the computing device. The response may be digitally associated with the matched input signal or specific attributes of the matched input signal. Alternatively or additionally, attributes may be extracted from the response and added as attributes in the matched input signal. Alternatively or additionally, certain attributes of the input signal may be modified based on the response, and the modifications may be highlighted. The first association may be transmitted to an entity associated with the second input signal. Additionally or alternatively, a digital portal may be created such that an entity associated with the second input signal may access the first association. Upon accessing the digital portal, the entity may be able to access analytics associated with the first association. Analytics may include information about the matched signal, the response, the attributes affected by the response, a comparison of a response of a the matched signal to other matched signals or unmatched signals. Any analytics described herein may include visual or graphical analytics.

In some embodiments, the set of second input signals is segmented into a first segment of input signals and a second segment of input signals. The second input signal may be associated with one of the segments (e.g., the first segment). Additionally or alternatively, in some embodiments, the method may further comprise determining whether to associate the matched input signal (e.g., the first input signal or the second input signal) with one of the segments based on the response to the targeted communication received from the computing device.

In some embodiments, any input signal (e.g., the second input signal) may be a predicted input signal. A signal matching process may be executed to determine a match between the first input signal and the predicted second input signal. A transmission may be generated and transmitted to a computing device based on a routing signal. The response to the transmission may determine attributes associated with the predicted second input signal. The attributes associated with the predicted input signal may be used to identify attributes of a segment associated with the predicted input signal. In some embodiments, a targeted communication may be transmitted to any segment of signals or any sub-sets of any segment of signals described herein. In some embodiments, the first set of input signals may be segmented similar to or differently from the second set of input signals.

In some embodiments, upon determining a set of matched signals, the attributes of the matched signals may be determined. The attributes of the matched signals may be used to create segments. For example, certain attributes and/or certain thresholds associated with certain attributes may be grouped together to create segments. For example, a first segment may include matched signals that have a first attribute that is greater than or equal to a first threshold level, a second attribute that is less than a second threshold level, and a third attribute that is not associated with any threshold levels. A second segment may include matched signals that have a first attribute that is less than the first threshold level, a second attribute that is less than the second threshold level, and a fourth attribute that is not associated with any threshold levels. In some embodiments, some attributes may be common to multiple segments. In some embodiments, a targeted communication may be transmitted to any segment of signals or any sub-sets of any segment of signals described herein. Responses to the targeted communication may be used by a digital signal processor to determine behavior (e.g., computing operation or transaction behavior) of or conduct research on the segments or signals associated with the segments, additional attributes associated with the segments, attributes for subsets for segments, relationships between segments, additional information associated with the attributes, etc.

In some embodiments, the method further comprises determining a third input signal received from a third input signal system. The third input signal may have been previously matched with the first input signal. The third input signal system may be associated with a different entity from the second input signal system. For example, the third input signal system (providing voter records such as where registered to vote, voting history, party affiliation, etc.) may be associated with a public entity while the second input signal system (providing purchase transaction or membership records associated with a retailing entity) may be associated with a private entity. The method may further comprise associating the third input signal with the first association, and providing analytics for this association via a digital portal as explained at various points in this disclosure.

In some embodiments, the method may comprise determining the second input signal is part of the second set of input signals at a first time, and that the first input signal matches the second input signal at a first time. At a second subsequent time, the second input signal may not be part of the second set of input signals (a signal absence event), which means that a match cannot be determined between the first input signal and the second input signal at the second time. At or after the second time, the signal absence event may be associated with the first association. A user may be able to view the association of the signal absence event with the first association or analytics for this association by accessing the portal described in this disclosure. Alternatively, at the second time, the second input signal's attributes may have changed such that the first input signal does not match the second input signal at the second time. This "no match" event may be associated with the first association. A user may be able to view the association of the "no match" event with the first association or analytics for this association by accessing the portal described in this disclosure.

In some embodiments, upon determining the signal absence event or the "no match" event, the method may further comprise generating a second targeted communication for transmission to the computing device accessible using the routing signal, wherein the second targeted communication is based on the signal absence event or the "no match" event. The second targeted communication may be transmitted to the computing device described herein. Upon receiving a response to the second targeted communication, the method may further comprise associating this response to the first association. The contents of the response may be used to determine reasons for the signal absence or "no match" events. The reasons may be determined by a digital signal processor described herein.

In some embodiments, the first input signal may comprise a digital computing device signal that comprises a digital computing device signal attribute. The digital computing device signal attribute may be based on monitoring a computing device or a user history (for multiple computing devices) associated with the first input signal or the second input signal. The history may include a network (e.g., Internet or local network) browsing history, digital shopping history, application download history, application usage history, advertisement presentation history, advertisement interaction (e.g., ads click history), etc. The method may further comprise associating the computing device signal with the first association. The history may be monitored by placing a digital cookie on a computing device associated with a user or a digital profile associated with a user. The digital cookie may placed after receiving permission from the user to place the digital cookie on the user's computing device. Any association described herein along with analytics for any association may be accessed using the portal described herein.

In some embodiments, the method further comprises determining a correlation between a signal attribute from the first set of signal attributes and a signal attribute from the second set of signal attributes. These signal attributes may be matching or non-matching signal attributes associated with matched signals. For example, the signals may have been matched based on these signal attributes or other signal attributes. By determining and analyzing such matching or non-matching signal attributes over a set of matched signals, the digital signal processor described herein may be able to construct a correlative model. The correlative model may be accessible through a portal described herein.

As described herein, a digital signal processor may determine that the first input signal matches the second input signal. Alternatively, a digital signal processor may determine that the first signal does match a second input signal. In some embodiments, the matched input signal or non-matched input signal may be associated with a mobile device. In some embodiments, any reference to mobile device may equivalently refer to a user of the mobile device. In some embodiments, the digital signal processor may receive, in real-time, location information associated with the mobile device. The location information may be a network location, a GPS location, a physical location of a beacon or cell tower located near or nearest to the mobile device, a location associated with execution of a mobile device computing operation or transaction such as a purchase transaction or application downloading or interaction operation or a short-range interaction with a beacon such as a Bluetooth Low Energy beacon, an establishment where the mobile device has executed a computing transaction (e.g., a computing transaction such as a purchase transaction executed with a real-time sensor of a point-of-sale terminal, a computing transaction such as an identification transaction identifying the mobile device, a check-in transaction executed via a network such as a social network, etc.). In some embodiments, the location information may be obtained by a computing server, in communication with both the apparatus described herein and the mobile device, pinging the mobile device, either directly or indirectly, and receiving location information associated with the mobile device. In some embodiments, the apparatus described herein may obtain the location information of the mobile device directly from the mobile device. In some embodiments, any current location or computing operation associated with an input signal may be referred to as a current or real-time attribute.

Using the location information of the mobile device, the digital signal processor may determine where the mobile device is located (e.g., at a particular establishment that is synchronous with the attributes of the input signal, at a particular establishment that is asynchronous with the attributes of the input signal, etc.). In some embodiments, the location information may refer to just the location information. In other embodiments, the location information may refer to a computing operation associated with the location information. In some embodiments, the location information or the computing information may be referred to as a real-time or current attribute associated with the input signal. The digital signal processor may use the location information to generate a location-targeted or geo-targeted transmission. In some embodiments, the transmission may prompt the user to respond to the transmission at or near the location, or within a particular period of time upon receipt of the transmission. In some embodiments, the transmission may be valid only for a particular location (e.g., the current or real-time location associated with the input signal). Therefore, a response to the transmission may not be able to be transmitted outside the particular location. In some embodiments, an incentive may be provided (e.g., a reward) for responding to the transmission at or near the location, or within a particular period of time upon receipt of the transmission. As used herein, a location that is synchronous with attributes of the input signal means that a mobile device associated with the input signal may be expected to be found at the location based on the attributes of the input signal. For example, if an attribute of the input signal is that a user associated with the input signal is a current loyalty member of a particular establishment (or a past loyalty member of a particular establishment who is no longer a member of that particular establishment), and the location of the user is determined to be at a competitor establishment or a different establishment, then the location of the user (i.e., the location associated with the input signal) is not synchronous (i.e., asynchronous) with the attributes of the input signal. As a further example, if an attribute of the input signal is that a user normally (e.g., based on past computing operation history of the user over a particular period of time) executes a first computing operation at a particular location, and the user is currently determined to execute a second computing operation at the particular location or a different location, then the second operation is not synchronous with the attributes of the input signal. As a further example, if an attribute of the input signal is that a user associated with the input signal is a loyalty member of a particular establishment, and the location of the user is determined to be at the same establishment, then the location associated with the input signal is synchronous with the attributes of the input signal. In some embodiments, a current or real-time attribute may be determined to be synchronous or asynchronous with the attributes of the input signal even though current or real-time attribute does not have a "like" attribute in the attributes of the input signal. For example, the current or real-time attribute may be a location or a computing operation, and the attributes for the input signal do not include a location or a computing operation.

When the location (or the computing operation) associated with the input signal is determined to be asynchronous with the attributes of the input signal, a targeted communication may be prepared. The targeted communication may be transmitted to a mobile device associated with the user or to a display associated with a real-time sensor at the location. The targeted communication may prompt for a response in real-time. Analysis of the response by a digital signal processor may determine the reasons why a user associated with the input signal is at a location (e.g., executing a computing transaction at the location) that is asynchronous (or synchronous) with attributes of the input signal or why a computing operation is being executed at the location that is asynchronous (or synchronous) with attributes of the input signal. In some embodiments, the targeted communication may be transmitted to the mobile device or the display associated with the real-time sensor either prior to, during, or after executing a computing transaction (e.g., a purchase transaction) at the location. The computing transaction may be executed either wholly by the mobile device or by the mobile device in coordination with a computing device at the location that is in communication with the real-time sensor (for determining presence of a mobile device, for conducting a purchase transaction with the mobile device or other transaction mechanism, etc.) at the location. In some embodiments, the targeted communication may be presented to a user following execution of the computing transaction but prior to receiving confirmation of execution of the computing transaction (e.g., a receipt or a bill). In some embodiments, a response to the targeted communication may need to be received by any apparatus described herein in order for the user to receive confirmation of execution of the computing transaction.

As a further example, an attribute of the input signal is that of a home location associated with the input signal. A home location associated with the input signal may be defined as a location where the user associated with the input signal spends most of the user's time. The location may be determined based on the amount of time the GPS coordinates of the user are associated with that location or a volume of computing transactions executed at a particular location. As used herein, the term transaction may also be referred to as an operation. For example, a home location of a user may be a first state. In some embodiments, the digital signal processor may determine a current location associated with the input signal is asynchronous with an attribute of the input signal (e.g., the home location of the user). The current location associated with the input signal may be a different state (e.g., a second state). In some embodiments, immediately upon determining that the current location associated with the input signal is asynchronous with the home location associated with the input signal, a targeted communication may be prepared and transmitted to the mobile device associated with the input signal. As an example, a user may receive this transmission as soon as (i.e., in real-time) the user's flight lands in the second state, or as soon as the user enters an airport in the second state. As used herein, the term "real-time" in any context may refer to any immediately after, substantially simultaneously as, a few microseconds, or milliseconds, or seconds after, a few minutes after, a few hours after, a period of time after, etc.

In some embodiments, the location attributes of an input signal (e.g., a matched input signal or a non-matched input signal) may be used to determine that a user or a mobile device of the user associated with the input signal is currently executing a computing operation (e.g., a purchase transaction) at an establishment. Either the location or the computing operation may be synchronous or asynchronous with the attributes of the input signal. A targeted communication may be prepared and transmitted to the mobile device in real-time upon determination of the synchronous or asynchronous location or computing operation. A response to the targeted communication may be used by the digital signal processor to determine the reasons for the synchronous or asynchronous location or computing operation. In some embodiments, two attributes may be synchronous when they are equivalent. In some embodiments, two attributes may be synchronous when they are not equivalent but are consistent with each other for the same input signal. In some embodiments, the terms establishment and entity may be used interchangeably.

The first input signal system, the second input signal system, and any other input signal system may refer to a database such as a relational database. Any signal as described herein may be associated with a single user or multiple users. Any signal may comprise identification information associated with a user (e.g., name, address, email address, age, employment history, list of relatives, etc.). In some embodiments, the first input signal may refer to one or more behavioral or research signals associated with a user (e.g., user rides a bike twice a week, user goes fishing once a week, etc.). The behavioral or research signals may either be self-reported by a user or determined based on monitoring a user's activity (e.g., computing device activity, computing transaction activity, event attendance history, etc.). The second input signal may be associated with a particular entity. For example, the second input signal may refer to purchase transaction or membership history associated with the user for a particular entity. A targeted communication may refer to a survey such as a customized survey that is transmitted to the user based on attributes of the user derived from the first input signal system and the second input signal system. A survey may comprise one or more questions for prompting answers by a user. Additionally or alternatively, the survey may not be a self-reporting survey such that answers to survey questions are automatically determined based on a user's digital behavior (e.g., browsing history, digital shopping habits, advertisement clicking history, time spent on certain sites, search history, etc.). A response to the survey may include answers to questions in the survey. The response may also not include answers to some questions in the survey, e.g., when the user did not answer some questions or when enough information could not be determined to answer a survey question. In some embodiments, an incentive such as a reward may be provided to the user for responding to the survey (e.g., within a particular period of time from receipt of the survey).

A routing signal may refer to contact information associated with the user. For example, the routing signal may refer to a network address such as an email address. A signal sensor may be a data sensor. Any input signal system, computing device, or routing signal described herein may refer to an address (e.g., a network address such as an email address) associated with the device or a user of the device. In some embodiments, the targeted communication may be transmitted to a first computing device, and a response to the targeted communication may be received from a different computing device. The term "signal" may refer to a single signal or multiple signals. The term "signals" may refer to a single signal or multiple signals. Any reference to a signal may be a reference to an attribute of the signal.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. An apparatus for intelligent matching of disparate input signals received from disparate input signal systems in a complex computing network for establishing targeted communication to a computing device associated with the intelligently matched disparate input signals, the intelligent matching and the targeted communication being necessarily rooted in computing technology, the apparatus comprising:
   a hardware signal communication interface for:
      establishing a first connection to a first input signal system, the first input signal system being associated with a first set of input signals, the first set of input signals being associated with a first set of signal attributes;
      receiving a first input signal, from the first set of input signals, on the first connection;
      establishing a second connection to a second input signal system, the second input signal system being associated with a second set of input signals, the second set of input signals being associated with a second set of signal attributes;
      receiving a second input signal, from the second set of input signals, on the second connection;
      establishing, based on a routing signal, a third connection to a computing device;
      transmitting a targeted communication to the computing device; and
      receiving a response to the targeted communication;
   a signal sensor for:
      sensing a first signal attribute, from the first set of signal attributes, associated with the first input signal; and
      sensing a second signal attribute, from the second set of signal attributes, associated with the second input signal; and
   a hardware digital signal processor for:
      applying a signal cleansing process to at least one attribute from the second set of signal attributes;
      determining the first signal attribute matches the second signal attribute;
      determining, based on the first signal attribute matching the second signal attribute, the first input signal matches the second input signal;
      identifying the routing signal associated with the first input signal or the second input signal;
      generating a targeted communication for transmission to the computing device accessible using the routing signal; and
      first associating, with the first input signal or the second input signal, the response to the targeted communication.

2. The apparatus of claim 1, wherein the hardware digital signal processor is further for integrating the first input signal with the second input signal.

3. The apparatus of claim 1, wherein the hardware signal communication interface receives the first input signal and the second input signal in real-time before the targeted communication is generated.

4. The apparatus of claim 1, wherein the second set of input signals is segmented into a first segment of input signals and a second segment of input signals.

5. The apparatus of claim 4, wherein the hardware digital signal processor is further for determining, based on the response to the targeted communication, whether to associate the first input signal or the second input signal with the first segment of input signals or the second set of input signals.

6. The apparatus of claim 1, wherein the hardware digital signal processor is further for:
   determining a third input signal received from a third input signal system, the third input signal previously matched with the first input signal; and
   second associating the third input signal with the first association.

7. The apparatus of claim 1, wherein the computing device comprises a mobile device.

8. The apparatus of claim 1, wherein the second input signal is part of the second set of input signals at a first time, wherein the hardware digital signal processor is further for determining the first input signal matches the second input signal at the first time.

9. The apparatus of claim 8, wherein the hardware digital signal processor is further for determining the second input signal is not part of the second set of input signals at a second time, wherein the determination that the second input signal is not part of the second set of input signals at the second time comprises a signal absence event.

10. The apparatus of claim 9, wherein the hardware digital signal processor is further for second associating the signal absence event with the first association.

11. The apparatus of claim 9, wherein the hardware digital signal processor is further for:
   generating a second targeted communication for transmission to the computing device accessible using the routing signal, the second targeted communication being based on the signal absence event;

receiving a second response to the targeted communication; and second associating the second response with the first association.

12. The apparatus of claim 1, wherein the second input signal is part of the second set of input signals at a first time, wherein the hardware digital signal processor is further for determining the first input signal matches the second input signal at the first time, wherein the second input signal is part of the second set of input signals at a second time, wherein the hardware digital signal processor is further for:

determining the first input signal does not match the second input signal at the second time; and second associating the determination that the first input signal does not match the second input signal at the second time with the first association.

13. The apparatus of claim 1, wherein the hardware digital signal processor is further for determining a correlation between a third signal attribute from the first set of signal attributes and a fourth signal attribute from the second set of signal attributes; and constructing a correlative model based on the correlation.

14. The apparatus of claim 1, wherein the first signal attribute comprises a digital computing device signal attribute, and wherein the digital computing device signal attribute is based on monitoring a computing device history associated with the first input signal or the second input signal.

15. The apparatus of claim 1, wherein the hardware digital signal processor is further for receiving a computing device signal, and second associating the computing device signal with the first association.

16. The apparatus of claim 1, wherein the second input signal comprises a predicted second input signal.

17. The apparatus of claim 1, wherein the hardware digital signal processor is further for:

determining a third set of input signals associated with the first input signal system that matches with a fourth set of input signals associated with the second input signal system;

determining attributes associated with a matched set of input signals;

determine, based on the attributes, a first segment of the input signals and a second segment of the input signals; and generating, based on a real-time attribute, a segment targeted communication for transmission to the first segment of the input signals.

18. The apparatus of claim 1, wherein the hardware digital signal processor is further for:

determining a real-time attribute associated with the first input signal or the second input signal;

determining the real-time attribute associated with the first input signal is asynchronous with a matched set of attributes associated with the first input signal or the second input signal; and generating a targeted communication for real-time transmission to the computing device.

19. The apparatus of claim 1, wherein the hardware digital signal processor is further for:

determining a real-time attribute associated with the first input signal or the second input signal;

determining the real-time attribute associated with the first input signal is synchronous with a matched set of attributes associated with the first input signal or the second input signal; and generating, based on the real-time attribute, a targeted communication for real-time transmission to the computing device.

20. A method for matching of disparate input signals received from disparate input signal systems in a complex computing network for establishing targeted communication to a computing device associated with the matched disparate input signals, the method comprising:

establishing a first connection to a first input signal system, the first input signal system being associated with a first set of input signals, the first set of input signals being associated with a first set of signal attributes;

receiving, using a hardware signal communication interface, a first input signal, from the first set of input signals, on the first connection;

establishing a second connection to a second input signal system, the second input signal system being associated with a second set of input signals, the second set of input signals being associated with a second set of signal attributes;

receiving, using the hardware signal communication interface, a second input signal, from the second set of input signals, on the second connection;

sensing a first signal attribute, from the first set of signal attributes, associated with the first input signal; and sensing a second signal attribute, from the second set of signal attributes, associated with the second input signal; and applying, using a hardware signal processor, a signal cleansing process to at least one attribute from the second set of signal attributes;

determining, using the hardware signal processor, the first signal attribute matches the second signal attribute;

determining, using the hardware signal processor, based on the first signal attribute matching the second signal attribute, the first input signal matches the second input signal;

identifying, using the hardware signal processor, a routing signal associated with the first input signal or the second input signal;

establishing, based on the routing signal, a third connection to a computing device;

generating, using the hardware signal processor, a targeted communication for transmission to the computing device accessible using the routing signal;

transmitting, using the hardware signal communication interface, the targeted communication to the computing device;

receiving, using the hardware signal communication interface, a response to the targeted communication; and first associating, using the hardware signal processor, with the first input signal or the second input signal, the response to the targeted communication.

* * * * *